United States Patent Office 3,133,073
Patented May 12, 1964

3,133,073
3-ARYL-1,5-IMINOCYCLOALKANES AND PREPARATION THEREOF
Sydney Archer, Bethlehem, N.Y., assignor to Sterling Drug Inc., New York, N.Y., a corporation of Delaware
No Drawing. Filed Dec. 10, 1959, Ser. No. 858,560
8 Claims. (Cl. 260—292)

This invention relates to bicyclic amino compounds and in particular is concerned with 1,5-iminocycloalkanes, monosubstituted in the 3-position by monocyclic aryl, and the preparation thereof.

In the 3-(monocyclic aryl)-1,5-iminocycloalkanes of the invention, the cycloalkane preferably has seven or eight ring members. The compounds preferably thus contain the ring structure of cycloheptane or cyclooctane. The cycloalkane ring carbon atoms can be substituted by conventional radicals such as lower-alkyl and lower-alkoxy. The nitrogen atom of the 1,5-imino bridge can be unsubstituted, or substituted by a hydrocarbon radical free of ethylenic or acetylenic unsaturation, or by such radicals substituted by conventional substituents such as halogen or lower-alkoxy.

Pharmacological evaluation of the compounds of the invention has demonstrated that they cause an increase in the blood pressure and are useful as central nervous system stimulants.

A particular aspect of the invention relates to 3-(monocyclic aryl) substituted tropanes and granatanines having the general formula

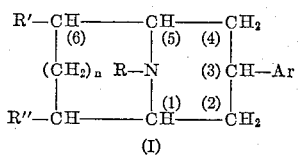

wherein Ar represents monocyclic aryl, R represents hydrogen, lower-alkyl or monocarbocyclic aryl-lower-alkyl, R' and R" represent hydrogen or lower-alkoxy, and $n$ is 0 or 1. It is preferred that when $n$ is 1 R' and R" represent hydrogen.

In the above general Formula I, Ar represents a monocyclic aryl radical and thus stands for a phenyl ring or an aromatic-type heterocyclic ring, optionally substituted by conventional groups inert under the conditions of the processes used to prepare the compounds. A preferred class for Ar comprises phenyl, thienyl, pyridyl and furyl, and such rings substituted by from one to three radicals selected from lower-alkyl, lower-alkoxy, halogen (including fluorine, chlorine, bromine and iodine), lower-alkylmercapto and trifluoromethyl. The lower-alkyl, lower-alkoxy and lower-alkylmercapto radicals contain from one to about four carbon atoms, thus including, inter alia, methyl, ethyl, propyl, isopropyl, butyl, methoxy, ethoxy, propoxy, isopropoxy, butoxy, methylmercapto, ethylmercapto and butylmercapto.

In the above general Formula I, R represents hydrogen, lower-alkyl or monocarbocyclic aryl-lower-alkyl. The term "lower-alkyl" here stands for an alkyl radical or bridge of from one to about eight carbon atoms. The term "monocarbocyclic aryl" stands for the same types of radicals defined above for Ar except that heterocyclic radicals are excepted. R thus stands for such radicals as methyl, ethyl, propyl, isopropyl, butyl, hexyl, octyl, benzyl, 2-phenylethyl, 4-phenylbutyl, p-tolylmethyl, p-methoxyphenylmethyl, 2-chlorobenzyl, and the like. The radical R preferably has no more than about ten carbon atoms.

In the above general Formula I, R' and R" represent hydrogen or lower-alkoxy radicals and can be the same or different. When R' and R" represent lower-alkoxy they contain from one to about four carbon atoms and thus stand for such radicals as methoxy, ethoxy, propoxy, isopropoxy, butoxy and the like.

Referring to the above general Formula I, the compounds where $n$ is 0 belong to the tropane series whereas the compounds where $n$ is 1 belong to the granatanine series. In these compounds there is a possibility of stereoisomerism depending upon whether the substituent in the 3-position, Ar, is on the same side (beta configuration) or the opposite side (alpha configuration) of the molecule as the N–R bridge. In the tropane series these stereoisomers are known as tropanes and pseudotropanes, respectively.

The compounds of the invention are prepared as follows:

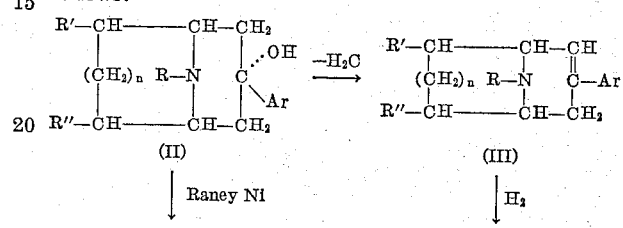

I. [Pseudo (β) series]      I. [Normal (α) series]

A 3α-hydroxy-3β-(monocyclic aryl) substituted 1,5-iminocycloalkane (II) heated with Raney nickel catalyst undergoes dehydroxylation with retention of configuration to give a compound of Formula I of the pseudo (β) series. If, however, the aryl carbinol (II) is first dehydrated, as by treatment with thionyl chloride to replace the hydroxyl radical by chlorine followed by dehydrochlorination with an alkali metal hydroxide, and the resulting 3-aryl-1,5-imino-2-cycloalkene (III) is then hydrogenated catalytically, a compound of Formula I of opposite configuration [normal (α) series] is obtained.

The Raney nickel dehydroxylation of the aryl carbinol (II) takes place in an inert solvent at a temperature between about 50° C. and 150° C. The reduction is brought about by residual hydrogen in the catalyst. A preferred inert solvent is a lower-alkanol.

The catalytic hydrogenation of the 3-aryl-1,5-imino-2-cycloalkene (III) takes place in an inert solvent at temperatures between about 20° C. and 100° C. The catalyst can be any of those known to be effective in reducing ethylenic linkages of the styrene type, including such catalysts as Raney nickel, platinum oxide, nickel on kieselguhr, copper-aluminum oxide, and the like.

The intermediate aryl carbinols of Formula II are readily prepared by reacting under anhydrous conditions the corresponding 3-oxo compound with an organometallic compound, ArM, wherein M is a metal-containing moiety such as bromomagnesium or lithium, and hydrolyzing the intermediate complex. The 3-oxo compounds in turn are prepared by the classic Robinson synthesis, i.e., condensation of succindialdehyde, glutaric dialdehyde or derivatives thereof

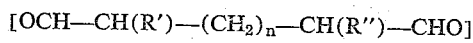

with a primary amine ($RNH_2$) and acetonedicarboxylic acid ester ($EtOOC—CH_2—CO—CH_2—COOEt$), followed by hydrolysis and decarboxylation.

The acid-addition salts and the quaternary ammonium salts of the bases herein described are the form in which the bases are most conveniently prepared for use and are the full equivalents of the subject matter specifically claimed. The preferred salts are water-soluble pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing the invention, it has been found convenient to form the hydrochloride salt. However, other appropriate pharmacologically acceptable salts within the scope of the invention are those of mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate, and quinate salts, respectively. The quaternary ammonium salts are obtained by the addition of esters having a molecular weight less than about 200 to the free base form of the compounds. A preferred class of esters comprises lower-alkyl, lower-alkenyl or monocarbocyclic aryl-lower-alkyl esters of inorganic acids or organic sulfonic acids, and includes such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The quaternary ammonium salts are prepared by mixing the free base and the alkyl, alkenyl or aralkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Although pharmacologically acceptable salts are preferred, those having toxic anions are also useful. All acid-addition salts are useful as intermediates in purification of the free base form even if the particular salt per se is not desired as the final product, as for example when the salt is formed only for purposes of purification or identification, or when it is used as an intermediate in preparing a pharmacologically acceptable salt by ion exchange procedures. Similarly, the quaternary ammonium salts, regardless of the nature of the anions, are useful in characterization of the free base forms, or as intermediates in the formation of other quaternary ammonium salts by ion exchange procedures.

The structure of the compounds of the invention is established by the mode of synthesis and by chemical analysis. The assignment of configuration of the stereoisomers of compounds of Formula I was based upon the fact that the Raney nickel dehydroxylation of 3-phenyltropine would be expected to proceed with retention of configuration, whereas the hydrogenation of 3-phenyltropidine would preferentially take place by addition of hydrogen at the less hindered side of the molecule, leading to the compound of configuration opposite to that of the dehydroxylation reaction product.

The following examples will illustrate the invention without limiting the latter thereto.

Example 1

$3\beta$-phenyltropane [I; Ar is $C_6H_5$ ($\beta$-series), R is $CH_3$, R' and R'' are H, n is 0].—Moist Raney nickel catalyst (90 g.) was covered with 125 ml. of ethanol and 6.0 g. of $3\beta$-phenyl-$3\alpha$-hydroxytropane was added to the suspension. The mixture was refluxed for four hours, then filtered and the catalyst washed with fresh alcohol. The combined filtrates were concentrated and the residue was distilled to give 4.2 g. of $3\beta$-phenyltropane in the form of an oil, B.P. 92–94° C. (0.2 mm.).

A portion of the foregoing product was converted to the hydrochloride salt by dissolving it in ether and treating the solution with an excess of ethanolic hydrogen chloride. The crystalline solid which separated was collected by filtration and recrystallized from acetone. The $3\beta$-phenyltropane hydrochloride was obtained in the form of colorless prisms, M.P. 203.2–205.2° C. (corr.) after drying in vacuo for sixteen hours at 100° C.

Analysis.—Calcd. for $C_{14}H_{19}N \cdot HCl$: C, 70.70; H, 8.49; N, 5.89. Found: C, 70.72; H, 8.13; N, 6.00.

$3\beta$-phenyltropane hydrochloride when administered intravenously to dogs at a dose level of 0.08–0.16 mg./kg. of body weight, caused an increase of 40–60 mg. Hg in blood pressure. The acute intravenous toxicity ($LD_{50}$) of $3\beta$-phenyltropane hydrochloride in mice was found to be 0.77±0.06 mg./kg. in terms of the free base.

The picrate of $3\beta$-phenyltropane was prepared by treating a solution of the free base with a solution of an excess of picric acid in ethanol. The picrate was separated and recrystallized from aqueous dimethylformamide, giving a sample having the M.P. 211.5–213° C. (uncorr.).

Analysis.—Calcd. for $C_{14}H_{19}N \cdot C_6H_3N_3O_7$: C, 55.68; H, 5.38. Found: C, 56.39; H, 5.08.

The methiodide salt of $3\beta$-phenyltropane was prepared by treating a solution of $3\beta$-phenyltropane (prepared from 250 mg. of the hydrochloride salt) in 2 ml. of acetonitrile with 5 ml. of methyl iodide. The crystalline product which separated was collected by filtration, recrystallized from water and dried at 50° C.

$3\beta$-phenyltropane methiodide when administered intravenously to dogs at a dose level of 0.10–0.15 mg./kg. of body weight, caused an increase of 20–60 mg. Hg in blood pressure. The acute intravenous toxicity ($LD_{50}$) of $3\beta$-phenyltropane methiodide in mice was found to be 3.17±0.23 mg./kg. in terms of the cation.

Example 2

$3\alpha$-phenyltropane [I; Ar is $C_6H_5$ ($\alpha$-series), R is $CH_3$, R' and R'' are H, n is 0].—A solution of 32.7 g. of 3-phenyltropidine in ethanol was hydrogenated at 50° C. in the presence of Raney nickel catalyst at 1000 lbs. per sq. inch. After hydrogenation was complete (about one-half hour) the mixture was filtered and the filtrate was concentrated to dryness. The residue was distilled giving $3\alpha$-phenyltropane in the form of an oil, B.P. 128–131° C. (2.0 mm.) which solidified upon standing, M.P. 55–57° C. after recrystallization from hexane.

Similar results were obtained when the Raney nickel was replaced by platinum oxide catalyst.

A solution of the $3\alpha$-phenyltropane obtained above was dissolved in ether and converted to the hydrochloride salt with ethanolic hydrogen chloride. The $3\alpha$-phenyltropane hydrochloride thus obtained had the M.P. 217.4–218.8° C. (dec.) (corr.) after recrystallization from isopropyl alcohol. A mixed melting point of $3\alpha$-phenyltropane hydrochloride and $3\beta$-phenyltropane hydrochloride (Example 1) showed a depression to 195° C.

Analysis.—Calcd. for $C_{14}H_{19}N \cdot HCl$: C, 70.70; H, 8.49; N, 5.89. Found: C, 70.90; H, 8.47; N, 5.91.

$3\alpha$-phenyltropane hydrochloride when administered intravenously to dogs at a dose level of 0.30–0.60 mg./kg. of body weight, caused an increase of 20–40 mg. Hg in blood pressure. The acute intravenous toxicity ($LD_{50}$) of $3\alpha$-phenyltropane hydrochloride in mice was found to be 4.9±0.5 mg./kg. in terms of the free base.

The picrate of $3\alpha$-phenyltropane, prepared from a sample of the free base and an excess of ethanolic picric acid had the M.P. 196–197° C. (uncorr.).

Analysis.—Calcd. for $C_{14}H_{19}N \cdot C_6H_3N_3O_7$: C, 55.68; H, 5.38. Found: C, 55.85; H, 5.20.

The methiodide salt of $3\alpha$-phenyltropane was prepared from 3.33 g. of $3\alpha$-phenyltropane and 1.57 g. of methyl iodide in 15 ml. of acetonitrile. After one hour at room temperature the solid product which had separated was collected by filtration and recrystallized from ethanol to give 4.2 g. of $3\alpha$-phenyltropane methiodide, M. P. 298.2–300.2° C. (corr.).

*Analysis.*—Calcd. for $C_{15}H_{22}IN$: N, 4.08; I, 37.0. Found: N, 4.02; I, 36.8.

The 2-chlorobenzochloride salt of 3α-phenyltropane was prepared from 3.33 g. of 3α-phenyltropane and 1.77 g. of 2-chlorobenzyl chloride in 15 ml. of acetonitrile. The mixture was heated on a steam bath for two hours, then cooled and the solid product collected by filtration. After recrystallization from absolute ethanol there was obtained 2.6 g. of 3α-phenyltropane 2-chlorobenzochloride, M.P. 234.6–235.4° C. (corr.).

*Analysis.*—Calcd. for $C_{21}H_{25}Cl_2N$: N, 3.87; Cl, 19.57. Found: N, 3.86; Cl, 19.60.

Example 3

(a) *3β-(4-bromophenyl)-3α-hydroxytropane.*—n-Butyl bromide (20.6 g.) in 30 ml. of dry ether was added dropwise to a suspension of 2.58 g. of lithium wire in 90 ml. of dry ether stirred in a nitrogen atmosphere at −10° C. The mixture was allowed to warm up to 20° C. over a period of two hours, and then a solution of 35.4 g. of p-dibromobenzene in 120 ml. of dry ether was added dropwise at a rate so as to maintain gentle refluxing. The resulting mixture was refluxed for one-half hour longer, and then there was added dropwise 21 g. of 3-tropanone in 100 ml. of dry ether. The final mixture was allowed to stand at room temperature for about fifteen hours and then refluxed for three hours. Water (120 ml.) was gradually added, and the solid product was collected by filtration and recrystallized from aqueous ethanol using activated charcoal for decolorizing purposes. There was thus obtained 6.7 g. of 3β-(4-bromophenyl)-3α-hydroxytropane, M.P. 197.2–200.4° C. (corr.).

*Analysis.*—Calcd. for $C_{14}H_{18}BrNO$: N, 4.73; Br, 26.98. Found: N, 4.71; Br, 27.15.

The methiodide salt of 3β-(4-bromophenyl)-3α-hydroxytropane was prepared from 3.26 g. of the free base and 1.57 g. of methyl iodide in 100 ml. of absolute ethanol. Upon standing at room temperature the solid product separated and was collected by filtration and recrystallized from ethanol to give 3.7 g. of 3β-(4-bromophenyl)-3α-hydroxytropane methiodide, M.P. 298.0–>300° C. (corr.).

*Analysis.*—Calcd. for $C_{15}H_{21}BrINO$: N, 3.20; I, 29.0. Found: N, 3.18; I, 28.7.

(b) *3β-(4-bromophenyl)tropane* [I; Ar is 4-BrC₆H₄ (β-series), R is CH₃, R' and R" are H, n is 0] can be prepared by heating 3β-(4-bromophenyl)-3α-hydroxytropane with Raney nickel catalyst according to the manipulative procedure described above in Example 1.

Example 4

(a) *3-(4-bromophenyl)tropidine* can be prepared by the following procedure: 3β-(4-bromophenyl)-3α-hydroxytropane is gradually added to a solution of an excess of thionyl chloride in anhydrous ether, while being cooled in an ice-salt bath. The resulting solution is warmed at about 50° C. for thirty minutes and the excess thionyl chloride and ether are removed by distillation in vacuo. The residue is dissolved in ethanol and treated with an excess of concentrated aqueous potassium hydroxide. The resulting product is isolated and purified by distillation.

(b) *3α-(4-bromophenyl)tropane* [I; Ar is 4-BrC₆H₄ (α-series), R is CH₃, R' and R" are H, n is 0] can be prepared by catalytic hydrogenation of 3-(4-bromophenyl)tropidine according to the manipulative procedure described above in Example 2.

Example 5

(a) *3β-phenyl-3α-hydroxynortropane* was prepared from 20 g. of 3-oxonortropane and phenyllithium, derived from 62.8 g. of bromobenzene and 5.55 g. of lithium, according to the manipulative procedure described above in Example 3, part (a). There was thus obtained 3β-phenyl-3α-hydroxynortropane in the form of its hydrochloride salt, M.P. 237.7–238.1° C. (corr.).

*Analysis.*—Calcd. for $C_{13}H_{17}NO \cdot HCl$: C, 65.22; H, 7.62; Cl, 14.51. Found: C, 65.20; H, 7.78; Cl, 14.60.

(b) *3β-phenylnortropane* [I; Ar is C₆H₅ (β-series), R, R' and R" are H, n is 0] can be prepared by heating 3β-phenyl-3α-hydroxynortropane with Raney nickel catalyst according to the manipulative procedure described above in Example 1.

Example 6

(a) *3-phenylnortropidine* can be prepared by dehydration of 3β-phenyl-3α-hydroxynortropane according to the procedure described above in Example 4, part (a).

(b) *3α-phenylnortropane* [I; Ar is C₆H₅ (α-series), R, R' and R" are H, n is 0] can be prepared by catalytic hydrogenation of 3-phenylnortropidine according to the manipulative procedure described above in Example 2.

Example 7

(a) *3β-(4-methylphenyl)-3α-hydroxytropane* can be prepared by replacing the p-dibromobenzene in Example 3, part (a), with a molar equivalent amount of p-tolyl bromide.

(b) *3β-(4-methylphenyl)tropane* [I; Ar is 4-CH₃C₆H₄, R is CH₃, R' and R" are H, n is 0] can be prepared by replacing the 3β-phenyl-3α-hydroxytropane in Example 1 with a molar equivalent amount of 3β-(4-methylphenyl)-3α-hydroxytropane.

Example 8

(a) *3β-(2-ethylphenyl)-3α-hydroxytropane* can be prepared by replacing the p-dibromobenzene in Example 3, part (a), with a molar equivalent amount of 2-ethylphenyl bromide.

(b) *3β-(2-ethylphenyl)tropane* [I; Ar is 2-C₂H₅C₆H₄, R is CH₃, R' and R" are H, n is 0] can be prepared by replacing the 3β-phenyl-3α-hydroxytropane in Example 1 with a molar equivalent amount of 3β-(2-ethylphenyl)-3α-hydroxytropane.

Example 9

(a) *3β-(2,4-dimethylphenyl)-3α-hydroxytropane* can be prepared by replacing the p-dibromobenzene in Example 3, part (a), with a molar equivalent amount of 2,4-dimethylphenyl bromide.

(b) *3β-(2,4-dimethylphenyl)tropane* [I; Ar is 2,4-(CH₃)₂C₆H₃, R is CH₃, R' and R" are H, n is 0] can be prepared by replacing the 3β-phenyl-3α-hydroxytropane in Example 1 with a molar equivalent amount of 3β-(2,4-dimethylphenyl)-3α-hydroxytropane.

Example 10

(a) *3β-(2,4,6-trimethylphenyl)-3α-hydroxytropane* can be prepared by replacing the p-dibromobenzene in Example 3, part (a), with a molar equivalent amount of mesityl bromide.

(b) *3β-(2,4,6-trimethylphenyl)tropane* [I; Ar is 2,4,6-(CH₃)₃C₆H₂, R is CH₃, R' and R" are H, n is 0] can be prepared by replacing the 3β-phenyl-3α-hydroxytropane in Example 1 with a molar equivalent amount of 3β-(2,4,6-trimethylphenyl)-3α-hydroxytropane.

Example 11

(a) *3β-(4-methoxyphenyl)-3α-hydroxytropane* can be prepared by replacing the p-dibromobenzene in Example 3, part (a), with a molar equivalent amount of p-methoxyphenyl bromide.

(b) *3β-(4-methoxyphenyl)tropane* [I; Ar is 4-CH₃OC₆H₄, R is CH₃, R' and R" are H, n is 0] can be prepared by replacing the 3β-phenyl-3α-hydroxytropane in Example 1 with a molar equivalent amount of 3β-(4-methoxyphenyl)-3α-hydroxytropane.

Example 12

(a) *3β-(4-butoxyphenyl)-3α-hydroxytropane* can be prepared by replacing the p-dibromobenzene in Example 3, part (a), with a molar equivalent amount of 4-butoxyphenyl bromide.

(b) *3β-(4-butoxyphenyl)tropane* [I; Ar is

4-C₄H₉OC₆H₄

R is CH₃, R' and R" are H, n is 0] can be prepared by prepared by replacing the p-dibromobenzene in Example 1 with a molar equivalent amount of 3β-(4-butoxyphenyl)-3α-hydroxytropane.

*Example 13*

(a) *3β-(3,4-dimethoxyphenyl)-3α-hydroxytropane* can be prepared by replacing the p-dibromobenzene in Example 3, part (a), with a molar equivalent amount of 3,4-dimethoxyphenyl bromide.

(b) *3β-(3,4-dimethoxyphenyl)tropane* [I; Ar is 3,4-(CH₃O)₂C₆H₃, R is CH₃, R' and R" are H, n is 0] can be prepared by replacing the 3β-phenyl-3α-hydroxytropane in Example 1 with a molar equivalent amount of 3β-(3,4-dimethoxyphenyl)-3α-hydroxytropane.

*Example 14*

(a) *3β-(3,4,5-trimethoxyphenyl) - 3α - hydroxytropane* can be prepared by replacing the p-dibromobenzene in Example 3, part (a), with a molar equivalent amount of 3,4,5-trimethoxyphenyl bromide.

(b) *3β-(3,4,5 - trimethoxyphenyl)tropane* [I; Ar is 3,4,5-(CH₃O)₃C₆H₂, R is CH₃, R' and R" are H, n is 0] can be prepared by replacing the 3β-phenyl-3α-hydroxytropane in Example 1 with a molar equivalent amount of 3β-(3,4,5-trimethoxyphenyl)-3α-hydroxytropane.

*Example 15*

(a) *3β-(4-fluorophenyl)-3α - hydroxytropane* can be prepared by replacing the p-dibromobenzene in Example 3, part (a), with a molar equivalent amount of 4-fluorophenyl bromide.

(b) *3β-(4-fluorophenyl)tropane* [I; Ar is 4-FC₆H₄, R is CH₃, R' and R" are H, n is 0] can be prepared by replacing the 3β-phenyl-3α-hydroxytropane in Example 1 with a molar equivalent amount of 3β-(4-fluorophenyl)-3α-hydroxytropane.

*Example 16*

(a) *3β-(4-chlorophenyl)-3α-hydroxytropane* can be prepared by replacing the p-dibromobenzene in Example 3, part (a), with a molar equivalent amount of 4-chlorophenyl bromide.

(b) *3β-(4-chlorophenyl)tropane* [I; Ar is 4-ClC₆H₄, R is CH₃, R' and R" are H, n is 0] can be prepared by replacing the 3β-phenyl-3α-hydroxytropane in Example 1 with a molar equivalent amount of 3β-(4-chlorophenyl)-3α-hydroxytropane.

*Example 17*

(a) *3β-(4-iodophenyl)-3α-hydroxytropane* can be prepared by replacing the p-dibromobenzene in Example 3, part (a), with a molar equivalent amount of p-diiodobenzene.

(b) *3β-(4-iodophenyl)tropane* [I; Ar is 4-IC₆H₄, R is CH₃, R' and R" are H, n is 0] can be prepared by replacing the 3β-phenyl-3α-hydroxytropane in Example 1 with a molar equivalent amount of 3β-(4-iodophenyl)-3α-hydroxytropane.

*Example 18*

(a) *3β-(4-methylmercaptophenyl)-3α- hydroxytropane* can be prepared by replacing the p-dibromobenzene in Example 3, part (a), with a molar equivalent amount of 4-methylmercaptophenyl bromide.

(b) *3β-(4-methylmercaptophenyl)tropane* [I; Ar is 4-CH₃SC₆H₄, R is CH₃, R' and R" are H, n is 0] can be prepared by replacing the 3β-phenyl-3α-hydroxytropane in Example 1 with a molar equivalent amount of 3β-(4-methylmercaptophenyl)-3α-hydroxytropane.

*Example 19*

(a) *3β-(3-trifluoromethylphenyl)-3α - hydroxytropane* can be prepared by replacing the p-dibromobenzene in Example 3, part (a), with a molar equivalent amount of 3-trifluoromethylphenyl bromide.

(b) *3β-(3-trifluoromethylphenyl)tropane* [I; Ar is 3-F₃CC₆H₄, R is CH₃, R' and R" are H, n is 0] can be prepared by replacing the 3β-phenyl-3α-hydroxytropane in Example 1 with a molar equivalent amount of 3β-(3-trifluoromethylphenyl)-3α-hydroxytropane.

*Example 20*

(a) *3β-(2-pyridyl)-3α-hydroxytropane* can be prepared by replacing the p-dibromobenzene in Example 3, part (a), with a molar equivalent amount of 2-bromopyridine.

(b) *3β-(2-pyridyl)tropane* [I; Ar is 2-pyridyl, R is CH₃, R' and R" are H, n is 0] can be prepared by replacing the 3β-phenyl-3α-hydroxytropane in Example 1 with a molar equivalent amount of 3β-(2-pyridyl)-3α-hydroxytropane.

*Example 21*

(a) *3β-(2-thienyl)-3α-hydroxytropane* can be prepared by replacing the p-dibromobenzene in Example 3, part (a), with a molar equivalent amount of 2-bromothiophene.

(b) *3β-(2-thienyl)tropane* [I, Ar is 2-thienyl, R is CH₃, R' and R" are H, n is 0] can be prepared by replacing the 3β-phenyl-3α-hydroxytropane in Example 1 with a molar equivalent amount of 3β-(2-thienyl)-3α-hydroxytropane.

*Example 22*

(a) *3β-(2-furyl)-3α-hydroxytropane* can be prepared by replacing the p-dibromobenzene in Example 3, part (a), with a molar equivalent amount of 2-bromofuran.

(b) *3β-(2-furyl)tropane* [I; Ar is 2-furyl, R is CH₃, R' and R" are H, n is 0] can be prepared by replacing the 3β-phenyl-3α-hydroxytropane in Example 1 with a molar equivalent amount of 3β-(2-furyl)-3α-hydroxytropane.

*Example 23*

(a) *3β-phenyl-3α-hydroxy-8-ethylnortropane* can be prepared by replacing the p-dibromobenzene and the 3-tropanone in Example 3, part (a), with molar equivalent amounts of bromobenzene and 8-ethyl-3-oxonortropane, respectively.

(b) *3β-phenyl-8-ethylnortropane* [I; Ar is C₆H₅, R is C₂H₅, R' and R" are H, n is 0] can be prepared by replacing the 3β-phenyl-3α-hydroxytropane in Example 1 with a molar equivalent amount of 3β-phenyl-3α-hydroxy-8-ethylnortropane.

*Example 24*

(a) *3β-phenyl-3α-hydroxy-6-methoxytropane* can be prepared by replacing the p-dibromobenzene and the 3-tropanone in Example 3, part (a), with molar equivalent amounts of bromobenzene and 6-methoxy-3-oxotropane, respectively.

(b) *3β-phenyl-6-methoxytropane* [I; Ar is C₆H₅, R is CH₃, R' is CH₃O, R" is H, n is 0] can be prepared by replacing the 3β-phenyl-3α-hydroxytropane in Example 1 with a molar equivalent amount of 3β-phenyl-3α-hydroxy-6-methoxytropane.

*Example 25*

(a) *3β-phenyl-3α-hydroxy - 6,7 - dimethoxytropane* can be prepared by replacing the p-dibromobenzene and the 3-tropanone in Example 3, part (a), with molar equivalent amounts of bromobenzene and 6,7-dimethoxy-3-oxotropane, respectively.

(b) *3β-phenyl-6,7-dimethoxytropane* [I; Ar is C₆H₅, R is CH₃, R' and R" are CH₃O, n is 0] can be prepared by replacing the 3β-phenyl-3α-hydroxytropane in Example 1 with a molar equivalent amount of 3β-phenyl-3α-hydroxy-6,7-dimethoxytropane.

*Example 26*

(a) *3β-phenyl-3α-hydroxy-8-benzylnortropane* can be prepared by replacing the p-dibromobenzene and the 3-tropanone in Example 3, part (a), with molar equivalent amounts of bromobenzene and 8-benzyl-3-oxonortropane, respectively.

(b) *3β-phenyl-8-benzylnortropane* [I; Ar is $C_6H_5$, R is $C_6H_5CH_2$, R' and R" are H, n is 0] can be prepared by replacing the 3β-phenyl-3α-hydroxytropane in Example 1 with a molar equivalent amount of 3β-phenyl-3α-hydroxy-8-benzylnortropane.

Example 27

(a) *3β-phenyl-3α-hydroxy-8-(4 - methoxybenzyl)nortropane* can be prepared by replacing the p-dibromobenzene and the 3-tropanone in Example 3, part (a), with molar equivalent amounts of bromobenzene and 8-(4-methoxybenzyl)-3-oxonortropane, respectively.

(b) *3β-phenyl-8-(4-methoxybenzyl)nortropane* [I; Ar is $C_6H_5$, R is $4-CH_3OC_6H_4CH_2$, R' and R" are H, n is 0] can be prepared by replacing the 3β-phenyl-3α-hydroxytropane in Example 1 with a molar equivalent amount of 3β-phenyl-3α-hydroxy-8-(4-methoxybenzyl)nortropane.

Example 28

(a) *3β-phenyl-3α-hydroxy-8 - (2,3 - dimethoxybenzyl)nortropane* can be prepared by replacing the p-dibromobenzene and the 3-tropanone in Example 3, part (a), with molar equivalent amounts of bromobenzene and 8-(2,3-dimethoxybenzyl)-3-oxonortropane, respectively.

(b) *3β-phenyl-8-(2,3-dimethoxybenzyl)nortropane* [I; Ar is $C_6H_5$, R is $2,3-(CH_3O)_2C_6H_3CH_2$, R' and R" are H, n is 0] can be prepared by replacing the 3β-phenyl-3α-hydroxytropane in Example 1 with a molar equivalent amount of 3β-phenyl-3α-hydroxy-8-(2,3-dimethoxybenzyl)nortropane.

Example 29

(a) *3β-phenyl-3α-hydroxy - 8 - (4 - chlorobenzyl)nortropane* can be prepared by replacing the p-dibromobenzene and the 3-tropanone in Example 3, part (a), with molar equivalent amounts of bromobenzene and 8-(4-chlorobenzyl)-3-oxonortropane, respectively.

(b) *3β-phenyl-8-(4-chlorobenzyl)nortropane* [I; Ar is $C_6H_5$, R is $4-ClC_6H_4CH_2$, R' and R" are H, n is 0] can be prepared by replacing the 3β-phenyl-3α-hydroxytropane in Example 1 with a molar equivalent amount of 3β-phenyl-3α-hydroxy-8-(4-chlorobenzyl)nortropane.

Example 30

(a) *3β-phenyl-3α-hydroxy - 8 - (2,4 - dichlorobenzyl)nortropane* can be prepared by replacing the p-dibromobenzene and the 3-tropanone in Example 3, part (a), with molar equivalent amounts of bromobenzene and 8-(2,4-dichlorobenzyl)-3-oxonortropane, respectively.

(b) *3β-phenyl-8-(2,4-dichlorobenzyl)nortropane* [I; Ar is $C_6H_5$, R is $2,4-Cl_2C_6H_3CH_2$, R' and R" are H, n is 0] can be prepared by replacing the 3β-phenyl-3α-hydroxytropane in Example 1 with a molar equivalent amount of 3β-phenyl-3α-hydroxy-8-(2,4-dichlorobenzyl)nortropane.

Example 31

(a) *3β-phenyl-3α-hydroxy-8-propyl - 6 - methoxynortropane* can be prepared by replacing the p-dibromobenzene and the 3-tropanone in Example 3, part (a), with molar equivalent amounts of bromobenzene and 8-propyl-6-methoxy-3-oxonortropane, respectively.

(b) *3β-phenyl-8-propyl-6-methoxynortropane* [I; Ar is $C_6H_5$, R is $CH_3CH_2CH_2$, R' is $CH_3O$, R" is H, n is 0] can be prepared by replacing the 3β-phenyl-3α-hydroxytropane in Example 1 with a molar equivalent amount of 3β-phenyl-3α-hydroxy-8-propyl-6-methoxynortropane.

Example 32

(a) *3β-phenyl-3α-hydroxy - 8 - butyl - 6 - ethoxynortropane* can be prepared by replacing the p-dibromobenzene and the 3-tropanone in Example 3, part (a), with molar equivalent amounts of bromobenzene and 8-butyl-6-ethoxy-3-oxonortropane, respectively.

(b) *3β-phenyl-8-butyl-6-ethoxynortropane* [I; Ar is $C_6H_5$, R is $CH_3CH_2CH_2CH_2$, R' is $C_2H_5O$, R" is H, n is 0] can be prepared by replacing the 3β-phenyl-3α-hydroxytropane in Example 1 with a molar equivalent amount of 3β-phenyl-3α-hydroxy-8-butyl-6-ethoxynortropane.

Example 33

*3β-phenyl-N-methylgranatanine* [I; Ar is $C_6H_5$, R is $CH_3$, R' and R" are H, n is 1] can be prepared by replacing the 3β-phenyl-3α-hydroxytropane in Example 1 with a molar equivalent amount of 3β-phenyl-3α-hydroxy-N-methylgranatanine.

Example 34

(a) *3β-phenyl-3α-hydroxy-8-octylnortropane* can be prepared by replacing the p-dibromobenzene and the 3-tropanone in Example 3, part (a), with molar equivalent amounts of bromobenzene and 8-octyl-3-oxonortropane (prepared from succindialdehyde, acetone dicarboxylic acid diethyl ester and octylamine according to the Robinsin synthesis), respectively.

(b) *3β-phenyl-8-octylnortropane* [I; Ar is $C_6H_5$, R is $C_8H_{17}$, R' and R" are H, n is 0] can be prepared by replacing the 3β-phenyl-3α-hydroxytropane in Example 1 with a molar equivalent amount of 3β-phenyl-3α-hydroxy-8-octylnortropane.

The following claims particularly point out and distinctly claim the subject matter which the applicant regards as his invention:

1. A compound having the formula $$\begin{array}{c} R'-CH\text{------}CH-CH_2 \\ | \quad\quad\quad\quad | \\ (CH_2)_n \quad R-N \quad CH-Ar \\ | \quad\quad\quad\quad | \\ R''-CH\text{------}CH-CH_2 \end{array}$$

wherein Ar is a member of the group consisting of phenyl, thienyl, pyridyl and furyl and these rings substituted by from one to three substituents selected from the group consisting of lower-alkyl, lower-alkoxy, halogen, lower-alkylmercapto and trifluoromethyl; R is a member of the group consisting of hydrogen, lower-alkyl and monocarbocyclic aryl-lower-alkyl, wherein monocarbocyclic aryl is a member of the group consisting of phenyl and phenyl substituted by from one to three substituents selected from the group consisting of lower-alkyl, lower-alkoxy, halogen, lower-alkylmercapto and trifluoromethyl, R' and R" are members of the group consisting of hydrogen and lower-alkoxy and n is selected from 0 and 1.

2. 3-phenyl-8-lower-alkyl-nortropane.
3. 3β-phenyltropane.
4. 3α-phenyltropane.
5. The process for preparing a compound having the formula $$\begin{array}{c} R'-CH\text{------}CH-CH_2 \\ | \quad\quad\quad\quad | \\ (CH_2)_n \quad R-N \quad CH-Ar \\ | \quad\quad\quad\quad | \\ R''-CH\text{------}CH-CH_2 \end{array}$$

wherein Ar is a member of the group consisting of phenyl, thienyl, pyridyl and furyl and these rings substituted by from one to three substituents selected from the group consisting of lower-alkyl, lower-alkoxy, halogen, lower-alkylmercapto and trifluoromethyl in the β-configuration with respect to R, R is a member of the group consisting of hydrogen, lower-alkyl and monocarbocyclic aryl-lower-alkyl, wherein monocarbocyclic aryl is a member of the group consisting of phenyl and phenyl substituted by from one to three substituents selected from the group consisting of lower-alkyl, lower-alkoxy, halogen, lower-alkylmercapto and trifluoromethyl, R' and R" are members of the group consisting of hydrogen and lower-alkoxy, and n is selected from 0 and 1, which comprises heating a compound having the formula $$\begin{array}{c} R'-CH\text{------}CH-CH_2 \\ | \quad\quad\quad\quad |\,\,\,\,.OH \\ (CH_2)_n \quad R-N \quad C \\ | \quad\quad\quad\quad |\,\,\,\,\backslash Ar \\ R''-CH\text{------}CH-CH_2 \end{array}$$

with Raney nickel catalyst in an inert solvent.

6. The process for preparing a compound having the formula

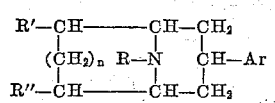

wherein Ar is a member of the group consisting of phenyl, thienyl, pyridyl and furyl and these rings substituted by from one to three substituents selected from the group consisting of lower-alkyl, lower-alkoxy, halogen, lower-alkylmercapto and trifluoromethyl in the α-configuration with respect to R, R is a member of the group consisting of hydrogen, lower-alkyl and monocarbocyclic aryl-lower-alkyl, wherein monocarbocyclic aryl is a member of the group consisting of phenyl and phenyl substituted by from one to three substituents selected from the group consisting of lower-alkyl, lower-alkoxy, halogen, lower-alkylmercapto and trifluoromethyl, R' and R" are members of the group consisting of hydrogen and lower-alkoxy, and $n$ is selected from 0 and 1, which comprises catalytically hydrogenating a compound having the formula

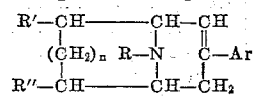

7. The process for preparing 3β-phenyltropane which comprises heating 3β-phenyl-3α-hydroxytropane with Raney nickel catalyst in an inert solvent.

8. The process for preparing 3α-phenyltropane which comprises catalytically hydrogenating 3-phenyltropidine.

References Cited in the file of this patent
FOREIGN PATENTS
644,115      Great Britain _____ Oct. 4, 1950
OTHER REFERENCES Cope et al.: J. Am. Chem. Soc., vol. 73, pp. 3419–3424 (1951).

Gyermek: Chem. Abstracts, vol. 49, col. 14197 (1955).

UNITED STATES PATENT OFFICE
CERTIFICATE OF CORRECTION

Patent No. 3,133,073   May 12, 1964

Sydney Archer

It is hereby certified that error appears in the above numbered patent requiring correction and that the said Letters Patent should read as corrected below.

Column 2, line 18, for "$\xrightarrow{+H_2C}$" read -- $\xrightarrow{-H_2O}$ --; column 7, line 5, for "prepared by replacing the p-dibromobenzene" read -- replacing the 3β-phenyl-3α-hydroxytropane --.

Signed and sealed this 15th day of September 1964.

(SEAL)
Attest:

ERNEST W. SWIDER
Attesting Officer

EDWARD J. BRENNER
Commissioner of Patents